United States Patent Office 3,836,576
Patented Sept. 17, 1974

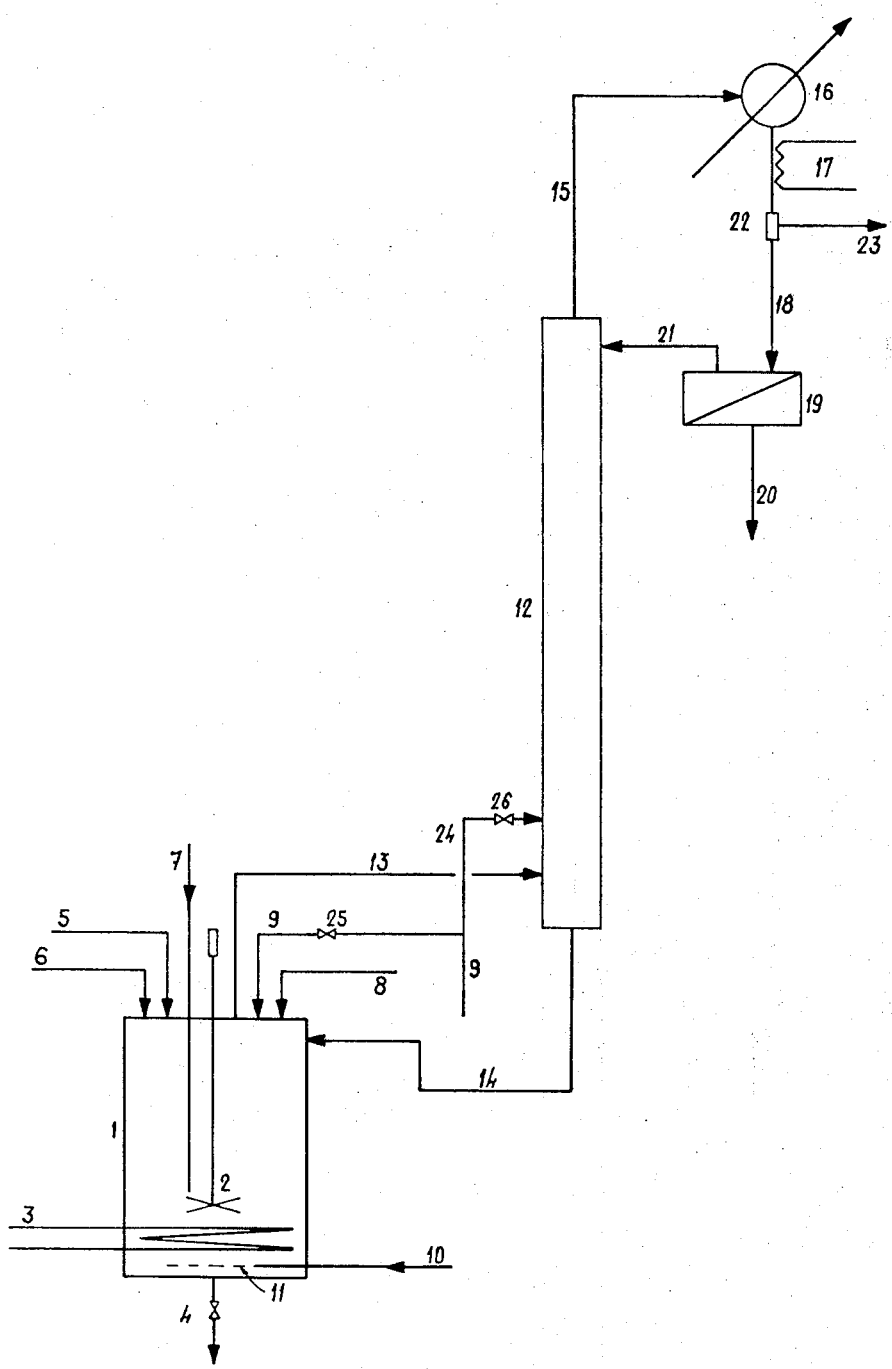

3,836,576
PROCESS FOR THE TRANSESTERIFICATION OF UNSATURATED ESTERS
Claude Falize, Le Havre, and Albert Bouniot, Melle, France, assignors to Rhone-Progil, Paris, France
Filed Apr. 23, 1973, Ser. No. 353,590
Claims priority, application France, May 17, 1972, 7218382
Int. Cl. C07c 69/54
U.S. Cl. 260—486 R                22 Claims

ABSTRACT OF THE DISCLOSURE

A process for the transesterification with an alcohol or alcohols containing 3–22 carbon atoms of a methacrylic acid ester formed of an alcohol having a lower boiling point than the above alcohol, and wherein the transesterification reaction is carried out in the presence of a titanium alcoholate as a catalyst and dinaphthyl phenylene diamine as a polymerization inhibitor, in which the reaction is carried out with or without bubbling air through the reaction mixture, and removing the displaced alcohol from the reaction mixture, as by distillation.

---

This invention relates to the transesterification of unsaturated esters.

When a transesterification is effected, by an alcohol or alcohol mixture, of an ester derived from an alcohol having a lower boiling point than the first named alcohol or alcohols, the ester being unsaturated due to the presence of a multiple bond, more especially an olefinic double bond, in one of its constituent radicals, more particularly in the radical of its constituent acid, the transesterification reaction is usually accompanied with a polymerization side reaction. This side reaction is detrimental from the standpoint of the process as well as from the economical standpoint by reason of its undesirable influence on the yield of the transesterification reaction, as from difficulties which result from the presence of polymers in the reaction mixture and in the separation of the products constituting the said mixture.

To avoid, or at least minimize, the development of such polymerization reaction, the present invention provides a process for carrying out the transesterification in the presence of both a catalyst and a polymerization inhibitor, in which the catalyst is constituted of a metal alcoholate and the polymerization inhibitor is constituted of an amine compound containing, in its molecule, at least one benzene nucleus, such as a phenyl or phenylene and/or at least one naphthalene nucleus such as naphthyl or naphthylene. The amino compound is characterized by a boiling point sufficiently high to enable separation as a tail product from the ester or esters formed, as by distillation of the components of the reaction mixture.

It has been found that by carrying out the reaction under these conditions, the transesterification of the ester derived from a lower boiling point alcohol by one or more higher boiling point alcohols, and removing the lower boiling point alcohol as it is formed in the reaction mixture, as by distillation and withdrawal, it becomes possible easily to reach conversion rates as high as 98–100% of the higher boiling point alcohol or alcohols to ester or esters. This is not possible in commercial practice in the absence of the amino polymerization inhibitor, such as employed in accordance with the practice of this invention.

In the practice of this invention, it has been found that a titanium alcoholate, more particularly titanium isopropylate (also called isopropyl titanate) is an especially interesting transesterification catalyst. As the polymerization inhibitor, use can be made of an amine such as paraphenylene diamine, phenyl naphthyl amine, or preferably, dinaphthyl phenylene diamine.

Amines of this type are generally only slightly soluble in the reaction mixture at the temperatures employed for the transesterification reaction. However, the amounts employed will generally be below their solubility limit in the said mixture, at the temperatures employed, but, nevertheless, because of the high price of such polymerization inhibitors, it is advantageous to recover as much as possible, as by filtration in the insolubilized state, from the reaction mixture, when the reaction is at an end and the reaction mixture is cold.

It has been found that the use of an amino compound, in accordance with the practice of this invention, especially such as dinaphthyl phenylene diamine, gives rise with an alcoholate, such as titanium isopropylate, to a catalytic couple which is materially more active than if hydroquinone were used instead of the amino compound, and materially more selective with regard to avoiding polymer formation. Moreover, hydroquinone has the inconvenience of behaving, during distillation, as a head product with respect to the esters formed (methacrylic esters in particular). This impedes subsequent use of these esters because of the comparatively large amounts of hydroquinone necessary which distills off with the esters. On the other hand, the amino inhibitors employed, in accordance with the practice of this invention, do not distill off with the esters and, after the distillation, the esters retain only a few p.p.m. thereof.

The amount of catalyst, such as titanium isopropylate, used depends upon the amount of water initially present in the reaction medium. It is preferred to reduce the amount of water to the practical minimum prior to the addition of the catalyst and the initiation of the transesterification reaction. It is possible to effect such a reduction in the same apparatus to be used for the transesterification, by conventional heteroazeotropic distillation.

It has also been found, in accordance with the practice of this invention, that the inhibiting action of the amino compound can be increased materially by bubbling moderate amounts of air through the reaction medium or mixture during the entire course of the reaction. All other things being the same, as a desirable consequence of such bubbling air, it is possible materially to reduce the amount of inhibitor to be used, as the case may be, to an amount below that corresponding to its solubility limit in the reaction medium when this medium is cooled, after the reaction, to about 20–30° C. Under such conditions, there is no need to filter the cooled reaction medium or mixture and thus the process is simplified.

The polymerization inhibition procedure, resulting from the presence of the amino compound, preferably in conjunction with air bubbling, obeys certain operating conditions selected within well defined ranges of values, depending upon the substances employed. There are indicated below the optimum general operation conditions for transesterification reaction of low molecular weight methacrylic esters, more particularly methylmethacrylate, effected by means of transesterifying alcohols containing from 3–22 carbon atoms.

There is used 10–50% molar excess of the starting ester with respect to the starting alcohol or alcohol mixture.

The operation is carried out at atmospheric pressure.

The operating temperature is within the range of 95–110° C.

The temperature is preferably maintained at the desired value by addition to the reaction medium or mixture of an auxiliary liquid having a suitable boiling point, preferably hexane. Hexane serves not only as a boiling point moderator for the reaction medium or mixture, but it may also serve as a methanol entrainer since it forms with methanol a heteroazeotropic distillate comprising 72% by weight hexane and decanting between 10–25° C.

The amount of catalyst, preferably titanium isopropylate, which may be dissolved in isopropanol, is within the range of 0.1% to 0.6% by weight with respect to the entire reaction medium or mixture.

The amount of polymerization inhibitor is within the range of 0.05% to 0.5% by weight with respect to the entire reaction medium or mixture, and can be varied depending upon whether the operation is carried out with or without air bubbling.

The amount of air, if air is bubbled through the reaction mixture, is within the range of 0.1 to 0.5 cubic meters per metric ton of methacrylic ester or methacrylic ester mixture to be produced.

The cooling temperature of the head distillate (heteroazeotropic distillate of hexane and methanol if the starting ester is methyl methacrylate) is within the range of 10–20° C.

The reaction time is within the range of 2.5 to 4 hours.

The accompanying drawing illustrates an apparatus which may be used to carry out the process of this invention.

This apparatus comprises a reaction vessel 1, provided with a rotary stirrer 2, a conventional indirect heat exchanger 3 for heating and cooling the reaction medium or mixture in the vessel, and a drain pipe with a valve 4. In addition, the vessel is provided with a number of pipes for introduction of the reactant and auxiliary substances as follows:

pipe 5 for the introduction of higher boiling point alcohol or alcohol mixture;
pipe 6 for the introduction of auxiliary liquid (hexane);
pipe 7 for the introduction of polymerization inhibitor;
pipe 8 for the introduction of catalyst;
pipe 9 for the introduction of ester to be transesterified;
pipe 10 for the introduction of air through a gas distribution device 11.

Vessel 1 is connected to a distillation column 12 by a pipe 13 through which the vapors evolved by the reaction medium or mixture pass from the vessel to the column, and by a pipe 14 through which the tailings are returned from the column to the vessel.

The head vapors of column 12, ordinarily constituted of an azeotropic mixture of lower boiling point alcohol liberated by the transesterification reaction and of auxiliary liquid, such as the methanol-hexane azeotropic mixture, issue from the top of the column into pipe 15 and are condensed during passage successively through condenser 16 and a cooler 17. The resulting condensate passes through pipe 18 into a decanter 19, in which it separates into two layers. One layer, rich in lower boiling point alcohol (methanol) is withdrawn through pipe 20, while the other layer, rich in auxiliary liquid (hexane), is returned through pipe 21 to the head portion of the column 12.

Inserted in pipe 18 is a gas-liquid separation device 22 which allows the air introduced through pipe 10 to be removed through pipe 23.

The process may be carried out in the apparatus described by operating as follows:

First, the vessel is loaded with suitable amounts of higher boiling point alcohol or alcohols, auxiliary liquid and polymerization inhibitor introduced through pipes 5, 6 and 7, respectively.

If need be, the alcohol or alcohols in the resulting mixture are dehydrated by carrying out a heteroazeotropic distillation of the water with the auxiliary liquid in the apparatus. The heteroazeotrope is decanted in 19, the water is removed through pipe 20 and the auxiliary liquid is refluxed to the column through pipe 21.

When the mixture in the vessel is anhydrous, it is cooled to approximately 40° C. and the inhibitor is activated by bubbling moderate amounts of air through 10 and 11. Then the catalyst is introduced into the vessel through pipe 8. The vessel is heated and there is introduced therein the ester to be transesterified through pipe 9. Alternatively, if the ester is hydrated, it may be fed continuously, not directly to the vessel through pipe 9 but to the lower portion of the column 12 through pipe 24. In the column, this ester is azeotropically dehydrated by the vapors which enter through pipe 13, below pipe 24. When thus freed from water, it flows down to the foot of the column, from which it passes continuously to vessel 1 through pipe 14. For the alternative use of pipes 9 and 24 in the process, these pipes are provided with valves 25 and 26, respectively.

As the transesterification reaction takes place, air bubbling is continued. The lower boiling point alcohol, liberated by the reaction, is removed through pipe 20 as a lower layer from the decantation and the air is removed through pipe 23. When the operation is at an end, the air bubbling is stopped and the raw reaction product is withdrawn through drain pipe 4.

The subsequent separation of the components of the raw product is effected in accordance with conventional distillation practices. The same is true of the recovery of the lower boiling point alcohol liberated by the reaction and, as the case may be, the recovery of the products entrained by the air removed through pipe 23.

As previously described, in the absence of air bubbling, the amount of inhibitor used is higher and it is necessary to provide filtration of the cooled raw product to recover insoluble inhibitor and to decrease the inhibitor content to a value corresponding to its solubility in the mixture at about 20–30° C., so that subsequent distillation is not impeded. The inhibitor recovered by filtration may be reused in the process.

The following examples illustrate various ramifications of the process of the invention and comparison of the use of the amino inhibitors in accordance with the practice of this invention with conventional non-amino inhibitor, hydroquinone:

EXAMPLE 1

Experiment A

The operation is carried out using hydroquinone as a polymerization inhibitor, thus not in accordance with the present invention.

Employing an apparatus, such as that represented in the drawing and described above, vessel 1 is loaded with the following substances:

Methyl methacrylate _____ 300 g. (3 moles).
n-Octanol _____ 260 g. (2 moles).
Titanium isopropylate _____ 1 g. (0.13%).
Hydroquinone _____ 3 g. (0.39%).
Hexane _____ 200 g.

In this example as well as in the following ones, use is made of pure titanium isopropylate, containing 28% of $TiO_2$.

The above mixture is brought to boiling at atmospheric pressure. Its boiling temperature remains between 95° and 110° C. during almost the entire reaction time. By the end of the reaction, however, a little hexane is added to maintain the temperature in this range.

The conversion rate of the octanol varies with time as follows:

|  | Percent |
|---|---|
| After 4 hours | 92 |
| After 5 hours | 93 |
| After 6 hours | 93.5 |
| After 7 hours | 94.5 |

After 7 hours, the operation is stopped because the reaction vessel has become laden with solid deposits (polymers).

The hexane and unconverted methyl methacrylate are recovered by distillation, followed by rectification of the remainder of the reaction liquid under an absolute pressure of 1 torr. N-octyl methacrylate of a purity of 96.55% is obtained containing a comparatively high proportion of unconverted octanol and small amounts of methyl methacrylate and high boiling by-products. Analysis of this product gives the following results:

| | Percent by weight |
|---|---|
| Octyl methacrylate | 96.55 |
| Octanol | 3.05 |
| Other impurities | 0.4 |

The rectification for obtaining this product permits the determination that, during the reaction, there has been formed more than 6% of high boiling by-products with respect to the amount of octyl methacrylate obtained.

Experiment B

There is used an amino inhibitor in accordance with the present invention.

The operation is carried out as described in Experiment A except that the hydroquinone is replaced by an equal weight of dinaphthyl phenylene diamine (which is commercially sold under the name "Nonox CI").

After 4 hours, at a temperature between 105° and 110° C., the octanol conversion rate reached 99.8%.

The mixture obtained is brown. Upon cooling, dinaphthyl phenylene diamine precipitates and is removed by filtration.

Analysis of the n-octyl methacrylate obtained by rectification under an absolute pressure of 1 torr gives the following results:

| | Percent by weight |
|---|---|
| Octyl methacrylate | 99.45 |
| Octanol | 0.25 |
| Other impurities | 0.3 |

This rectification enables determination that during the reaction there has been formed 2.5% of high boiling by-products with respect to the amount of octyl methacrylate obtained.

EXAMPLE 2

The operation is carried out substantially as in Experiment B of Example 1 except that a distillation cut comprising $C_{12}$ n-alkanols (about 75% by weight) and $C_{14}$ n-alkanols (about 25% by weight) is substituted for the octanol, the said cut being previously dehydrated.

Vessel 1 is loaded with the following substances:

| | |
|---|---|
| Methyl methacrylate | 375 g. (3.75 moles). |
| $C_{12}$–$C_{14}$ alkanol distillation cut | 600 g. (3.06 moles). |
| Titanium isopropylate | 3 g. (0.24%). |
| Dinaphthyl phenylene diamine | Do. |
| Hexane | 264 g. |

After 3 hours, at a temperature between 100° and 110° C., the conversion rate of the alkanols reaches 99%.

As in Experiment B of Example 1, upon cooling the final reaction mixture, dinaphthyl phenylene diamine precipitates, which necessitates a filtration for removal.

Analysis of the mixture of $C_{12}$–$C_{14}$ alkyl methacrylates, obtained by rectification under vacuum, shows that its purity is 99.5% and that it contains 0.25% by weight of alkanols. The results are very close to those of Example 1, Experiment B.

Rectification shows that the formation of high boiling by-products amounted to 2.5% with respect to the amount of $C_{12}$–$C_{14}$ alkyl methacrylates obtained.

EXAMPLE 3

The operation is carried out with air bubbling, in the apparatus employed in the foregoing examples and with the same alkanol mixture as in Example 2 but without previous dehydration.

Vessel 1 is loaded with the following substances:

| | |
|---|---|
| $C_{12}$–$C_{14}$ alkanol distillation cut | 740 g. (3.78 moles). |
| Dinaphthyl phenylene diamine | 1.45 g. |
| Hexane | 175 g. |

This mixture is dehydrated by heating so that the water initially contained in the alkanol distillation cut is azeotropically entrained by the hexane. After condensation of the vapors of the heterozaeotrope, the condensate is decanted in decanter 19. The water is removed by pipe 20 and the hexane is refluxed to the vessel through pipe 21 via column 12 and pipe 14.

The dehydrated mixture in the vessel is then cooled to 35° C. and air is introduced through pipe 10 and bubbled through gas distribution device 11, at a rate of 0.192 liter within 20 minutes.

There is then added to the mixture, 5.2 g. of titanium isopropylate catalyst, then 442 g. of methyl methacrylate (i.e. 4.42 moles) containing 0.02% of water. One should note that, as this methyl methacrylate is slightly hydrated, it would be logical not to introduce it directly into vessel 1 by pipe 9, but into column 12 by pipe 24. But as a mater of fact, since its water content is too low to be troublesome in actual practice, it may be introduced by either pipe.

The reaction time is 3 hours, during which the operating temperature is maintained between 105° and 110° C. while air is continuously bubbled, the total volume of air so bubbled amounting to 0.192 liter.

The final reaction mixture, after cooling to 20° C., has a viscosity of 2.5 centistoke and no precipitation of polymerization inhibitor takes place therein.

The conversion rate of the alkanols, at the end of the reaction, is 99.5%. Analysis of the mixture of $C_{12}$–$C_{14}$ alkyl methacrylates obtained by rectification under vacuum gives the same results as in Example 2. This rectification shows a high boiling by-product formation of 1.8% with respect to the amount of $C_{12}$–$C_{14}$ alkyl methacrylates obtained.

EXAMPLE 4

The operation of Example 3 is repeated but without air bubbling during the reaction.

The reaction time being the same, the final reaction mixture, after cooling to 20° C., has a viscosity of 9 centistoke, which indicates a higher polymer formation than in Example 3.

The conversion rate of the alkanols at the end of the reaction is 98.5%. Analysis of the mixture of methacrylates obtained by rectification under vacuum gives the same results as in Examples 2 and 3. This rectification shows a high boiling by-product formation of 2.5% with respect to the amount of $C_{12}$–$C_{14}$ alkyl methacrylates obtained.

EXAMPLE 5

The operation of Example 4 is repeated, except that there is used 5 g. of dinaphthyl phenylene diamine instead of 1.45 g. The viscosity of the final reaction mixture, after cooling to 20° C., is only 3.5 centistoke instead of 9 centistoke. As a counterpart, it also results that dinaphthyl phenylene diamine precipitates in the cooled mixture, necessitating filtration thereof.

The conversion rate of the alkanols, at the end of the reaction, is 98.5%. Analysis of the mixture of methacrylates obtained by rectification under vacuum gives the same results as in Examples 2–4. This rectification shows a high boiling by-product formation of 2% with respect to the amount of $C_{12}$–$C_{14}$ alkyl methacrylates obtained.

EXAMPLE 6

The operation is carried out substantially as in Example 3, vessel 1 being first loaded with the following substances:

| | |
|---|---|
| n-Butanol | 520 g. (7.05 moles). |
| Dinaphthyl phenylene diamine | 2.65 g. |
| Hexane | 168 g. |

After dehydration of this mixture, as in Example 3, there is added the catalyst (10.5 g. of titanium isopropylate), then 810 g. (8.1 moles) of methyl methacrylate.

The reaction is continued for 2.5 hours at a temperature between 105° and 110° C., the total volume of air bubbled during this time being 0.7 liter. The final reaction mixture, cooled to 20° C., has a viscosity of 1 centistoke and no polymerization inhibitor precipitation occurs therein.

The butanol conversion rate at the end of the reaction is 99.5%. Analysis of the n-butyl methacrylate obtained by rectification under vacuum gives the same results as in Examples 2–5. This rectification shows a high boiling by-product formation of 1.8% with respect to the amount of butyl methacrylate obtained.

EXAMPLE 7

The operation is carried out substantially as in Example 3, but instead of a mixture of $C_{12}$–$C_{14}$ alkanols, use is made of a distillation cut comprising $C_{16}$ n-alkanols (about 30% by weight) and $C_{18}$ n-alkanols (about 70% by weight), the said cut having not been previously dehydrated.

Vessel 1 is first loaded with the following substances:

$C_{16}$–$C_{18}$ alkanol distillation cut _____ 795 g. (3.1 moles).
Dinaphthyl phenylene diamine _____ 1.15 g.
Hexane_____ 218 g.

After dehydration of this mixture, there is added the catalyst (3.9 g. of titanium isopropylate), then 356 g. (3.56 moles) of methyl methacrylate.

The reaction time is 3 hours at a temperature of about 105° C. The total volume of air bubbled during this time is 0.3 liter. The final reaction mixture, cooled to 20° C., has a viscosity of 5.5 centistoke and no polymerization inhibitor precipitation takes place therein.

The conversion rate of the alkanols, at the end of the reaction, is 99%. Analysis of the mixture of $C_{16}$–$C_{18}$ alkyl methacrylates obtained by rectification under vacuum gives the same results as in Examples 2–6. This rectification shows a high boiling by-product formation of 1.4% with respect to the amount of $C_{16}$–$C_{18}$ alkyl methacrylates obtained.

We claim:

1. A process for transesterification by means selected from the group consisting of an alcohol containing from 3–22 carbon atoms or a mixture of such alcohols, of a methacrylic acid ester of an alcohol having a lower boiling point than the first named alcohol or alcohols, which process comprises carrying out the transesterification in the presence of both a titanium alcoholate as a catalyst and dinaphthyl phenylene diamine as a polymerization inhibitor.

2. A process as claimed in Claim 1 in which the methacrylic acid ester is methyl methacrylate.

3. A process as claimed in Claim 1 in which the titanium alcoholate is titanium isopropylate.

4. A process as claimed in Claim 3 in which the titanium isopropylate is employed in a dissolved state in isopropanol.

5. A process as claimed in Claim 1 wherein, during the transesterification, the process includes the step of removing the alcohol from the reaction as it is formed.

6. A process as claimed in Claim 5 in which the alcohol is removed by distillation.

7. A process as claimed in Claim 5 wherein the conversion rate of the higher boiling point alcohol or alcohols to ester or esters is carried on up to a value between 98% and 100%.

8. A process as claimed in Claim 1 wherein the operation is carried out with a reaction medium which has been dehydrated to the practically possible maximum extent prior to the addition of the catalyst and the starting of the transesterification reaction.

9. A process as claimed in Claim 8 wherein the dehydration of the reaction medium or mixture is performed in the same apparatus to be used for the transesterification, by conventional heteroazeotropic distillation.

10. A process as claimed in Claim 1 wherein there is used a molar excess of 10% to 50% of the ester subjected to transesterification with respect to the transesterifying alcohol or alcohol mixture.

11. A process as claimed in Claim 1 wherein the operation is carried out at atmospheric pressure.

12. A process as claimed in Claim 1 wherein the operation is carried out at a temperature within the range of 95°–110° C.

13. A process as claimed in Claim 12 wherein the temperature is maintained at the desired value by addition to the reaction medium or mixture of an auxiliary liquid having a suitable boiling point.

14. A process as claimed in Claim 13 wherein the said auxiliary liquid is hexane.

15. A process as claimed in Claim 14 starting from methyl methacrylate, wherein the methanol liberated by the transesterification is entrained out of the reaction mixture by heteroazeotropic distillation with the hexane.

16. A process as claimed in Claim 15 wherein the cooling temperature of the head distillate constituted by the hexane-methanol azeotrope is within the range of 10°–20° C.

17. A process as claimed in Claim 1 wherein the amount of titanium alcoholate is within the range of 0.1% to 0.6% by weight with respect to the whole reaction medium or mixture.

18. A process as claimed in Claim 1 wherein the amount of dinaphthyl phenylene diamine is within the range of 0.05% to 0.5% by weight with respect to the whole reaction medium or mixture.

19. A process as claimed in Claim 1 wherein moderate amounts of air are bubbled through the reaction medium or mixture during the running of the reaction.

20. A process as claimed in Claim 19 wherein there is bubbled through the reaction medium or mixture, an amount of air of 0.1 to 0.5 cubic meter per metric ton of methacrylic acid ester or methacrylic acid ester mixture to be produced.

21. A process as claimed in Claim 1 wherein the amount of dinaphthyl phenylene diamine is below that corresponding to the solubility limit thereof in the reaction medium or mixture cooled, after the reaction, to a temperature within the range of 20°–30° C.

22. A process as claimed in Claim 1 wherein the reaction time is within the range of 2.5 to 4 hours.

References Cited

UNITED STATES PATENTS

| | | | |
|---|---|---|---|
| 3,568,818 | 10/1962 | Werber | 260—486 R |
| 3,715,386 | 2/1973 | Sherr et al. | 260—486 R |

FOREIGN PATENTS

| | | | |
|---|---|---|---|
| 1,016,042 | 1/1966 | Great Britain | 260—486 |

LORRAINE A. WEINBERGER, Primary Examiner

P. J. KILLOS, Assistant Examiner